No. 608,109. Patented July 26, 1898.
W. E. DOW.
ELECTRIC LIGHT FOR SURGICAL PURPOSES.
(Application filed Mar. 26, 1897.)

(No Model.)

Witnesses:
Walter E. Lombard
Thomas J. Drummond

Inventor:
Willard E. Dow,
by Crosby & Gregory
Attys.

UNITED STATES PATENT OFFICE.

WILLARD E. DOW, OF BRAINTREE, MASSACHUSETTS.

ELECTRIC LIGHT FOR SURGICAL PURPOSES.

SPECIFICATION forming part of Letters Patent No. 608,109, dated July 26, 1898.

Application filed March 26, 1897. Serial No. 629,341. (No model.)

*To all whom it may concern:*

Be it known that I, WILLARD E. DOW, of Braintree, county of Norfolk, State of Massachusetts, have invented an Improvement in Electric Lights for Surgical Purposes, of which the following description, in connection with the accompanying drawings, is a specification, like letters on the drawings representing like parts.

It is the object of my invention to provide an improved electrical apparatus to enable the investigator to concentrate a light directly on the object and at the point under investigation, my invention being particularly intended as an aid to surgeons, physicians, oculists, and other specialists in their operations and investigations, and especially in exploring cavities.

Hitherto it has been customary to carry a mirror either on a standard or on the forehead of the operator and to reflect thereby on the object under investigation a ray of light from a lamp or other source of light at a distance. This apparatus, however, is frequently quite awkward to operate, requiring the operator to maintain more or less fixed and steady position, and even at best gives an unsteady and uncertain light, so far as the direct point of observation is concerned.

My invention has for its object to provide the required light directly on the forehead of the operator and to combine therewith suitable focusing apparatus which will direct the entire light on the point desired, my invention also including means to change the focus of the light as required for investigating near and far objects, and also includes further details of improvements, all of which will be hereinafter more fully specified, and thereafter defined in the appended claims, forming a part of this specification.

Figure 1:
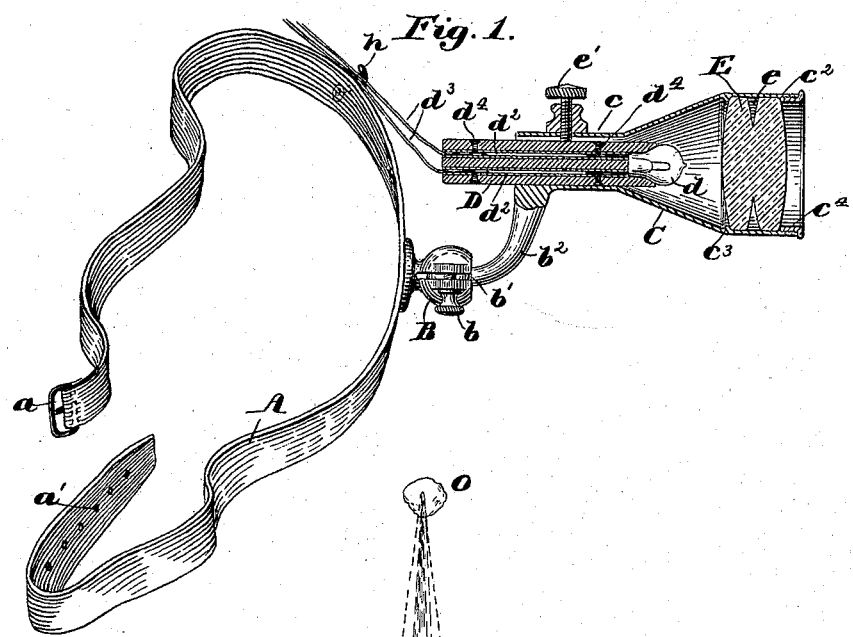
Figure 2:
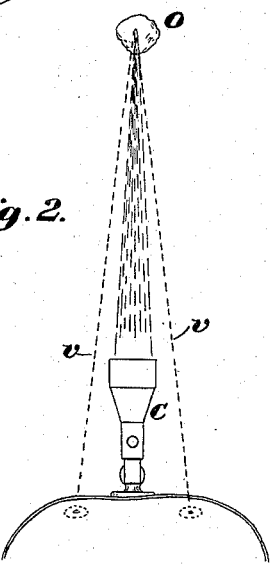

Referring to the drawings illustrative of the preferred embodiment of my invention, Figure 1 is a perspective view, partly in central vertical section, of my improved apparatus in operative position on a head-band. Fig. 2 is a broken top plan view thereof, diagrammatically illustrating the operation thereof.

The head-band A is herein shown as a leather band adapted to be passed about the head and secured by means of a buckle $a$ and perforated strap end $a'$, although I wish it understood that my invention is in no wise limited to the kind of band herein shown, inasmuch as any other means for securing the apparatus to the head may be used, if preferred.

At its middle front portion the band A is provided with a socket B, herein shown as formed in two parts and clamped together by a thumb-screw $b$ and arranged to retain a ball end $b'$ of a supporting-stem $b^2$ for the apparatus, the latter comprising the conical or funnel-shaped reflector C, having its sides preferably diverging at an angle of forty-five degrees, as herein shown, a central hollow shank $c$ extending at the rear and supported on the upper end of the stem $b^2$, as shown. Within this hollow shank is mounted, preferably adjustably, a carrier-rod D of insulating material, provided with a small electric lamp $d$ at its forward end and having embedded within it metallic conducting-tubes $d^2$ to receive the circuit-terminals $d^3$ at its rear end, rested over a hook $h$ on the band, and lamp terminals at its forward end, shown as clamped therein by means of screws $d^4$.

The lamp $d$ will be as small or smaller in cross-section than its carrier-rod, in order to protect the same from injury and also to enable it to be readily inserted at the rear through the shank C, the rod being clamped in adjustment by suitable means, (shown as a thumb-screw $e'$.) At its front end the reflector is provided with a condensing-lens E, (shown as a double convexo-convex lens,) formed in one piece and having simply an annular convexo-convex groove $e$ to separate and define the two lenses. This lens is held in a hood $c^2$ at the forward end of the reflector, being clamped against a shoulder $c^3$ by a threaded adjusting-ring $c^4$.

The entire apparatus is made relatively narrow and slender, as shown in Fig. 2, so that when the light is focused on an object or within an orifice, as indicated at $o$, the lines of vision $v$ of the investigator will not be interfered with in the slightest by the instrument, and yet the latter will focus all its concentrated rays directly on the spot of observation.

By loosening the universal joint at B the direction of the light may be varied to suit the exigencies of particular cases.

In operation the lamp $d$ will be moved forward or backward, as required, in order to focus the pencil of light directly on the point of operation according as it is necessary for the operator to get close to or away from the latter, and the reflector will be turned relatively to the head-band, as desired.

The light is condensed or gathered in by the lenses E, so that a lamp of minimum power answers the purpose in a superior way for purposes which would otherwise require a much larger light.

If the lamp should get broken, it is the work of a moment only to remove the same without otherwise interfering with the apparatus and replace another lamp and carrier within the shank of the reflector.

Many changes in details of construction and arrangements of parts may be resorted to without departing from the spirit and scope of my invention.

Having fully described my invention, what I claim as new, and desire to secure by Letters Patent, is—

1. The combination with a head-band, of a reflector carried thereby, a condensing-lens supported in front of said reflector, a lamp mounted between them, and means to adjust said lamp forward or backward relatively to the reflector, substantially as described.

2. In an electric device for surgical purposes, a band to secure the apparatus to the surgeon's head, a support secured to said band to be above and between the eyes of the operator, a reflector projecting from said support, an electric lamp within said reflector, said reflector having its apex toward the operator, and having its sides divergent at a small acute angle and terminating short of the lines of vision of the operator converging on the object under investigation, and said lamp being adjustable forward and backward along the axis of said conical reflector, substantially as described.

3. A reflector, having a central hollow shank extending axially at its rear, an electric lamp and carrier-rod therefor movable within said shank forward and backward relatively to the focus of the reflector, and means to clamp them in adjustment, substantially as described.

4. A reflector, having a central hollow shank extending centrally rearward from its center, and a lens at its front end, an electric lamp and carrier-rod therefor movable within said shank, and means to clamp them in adjustment, substantially as described.

5. In an instrument for surgical purposes, a tubular shank, an electric lamp, and its carrier-rod removably carried in said shank, the latter being of insulating material substantially fitting said shank and having two hollow conductors embedded within it to receive the circuit-terminals, and the lamp having no transverse section larger than said rod, whereby said carrier-rod and lamp may be inserted and removed together at pleasure, substantially as described.

In testimony whereof I have signed my name to this specification in the presence of two subscribing witnesses.

WILLARD E. DOW.

Witnesses:
GEO. H. MAXWELL,
JOHN C. EDWARDS.